US012613597B2

(12) United States Patent
Murabito et al.

(10) Patent No.: US 12,613,597 B2
(45) Date of Patent: Apr. 28, 2026

(54) SYSTEM AND METHOD FOR DISCERNING HUMAN INPUT ON A SENSING DEVICE

(71) Applicant: Qorvo US, Inc., Greensboro, NC (US)

(72) Inventors: Alfred Murabito, San Jose, CA (US); Arash Bastanfard, San Jose, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 18/690,957

(22) PCT Filed: Sep. 20, 2022

(86) PCT No.: PCT/US2022/044129
§ 371 (c)(1),
(2) Date: Mar. 11, 2024

(87) PCT Pub. No.: WO2023/044156
PCT Pub. Date: Mar. 23, 2023

(65) Prior Publication Data
US 2024/0402850 A1      Dec. 5, 2024

Related U.S. Application Data

(60) Provisional application No. 63/246,029, filed on Sep. 20, 2021.

(51) Int. Cl.
*G06F 3/041*          (2006.01)
(52) U.S. Cl.
CPC ...... *G06F 3/04186* (2019.05); *G06F 3/04164* (2019.05)

(58) Field of Classification Search
None
See application file for complete search history.

(56) References Cited

U.S. PATENT DOCUMENTS

| | | | | |
|---|---|---|---|---|
| 2013/0057507 A1* | 3/2013 | Shin | ...................... | G06F 3/0443 |
| | | | | 345/174 |
| 2013/0241887 A1* | 9/2013 | Sharma | ................. | G06F 3/0425 |
| | | | | 345/175 |
| 2020/0409489 A1* | 12/2020 | Munemoto | ......... | G06F 3/03545 |

(Continued)

OTHER PUBLICATIONS

Invitation to Pay Additional Fees and Partial International Search for International Patent Application No. PCT/US2022/044129, mailed Jan. 9, 2023, 14 pages.

(Continued)

*Primary Examiner* — Krishna P Neupane
(74) *Attorney, Agent, or Firm* — Withrow & Terranova, P.L.L.C.

(57) ABSTRACT

Systems and methods for detecting and classifying types of physical inputs on an input surface of a human machine interface (HMI) input structure are disclosed. In response to a physical input on the input surface, one or more sensor signals are received from respective sensors associated with the HMI input structure. One or more features are determined for each received sensor signal. Based on the one or more features for each sensor signal, a position on the input surface is determined by classifying the one or more sensor signals. The classification of the one or more sensor signals can be performed by one or more machine learning algorithms. Based on a classification of the physical input, an action associated with the determined location is executed.

19 Claims, 8 Drawing Sheets

(56)  References Cited

U.S. PATENT DOCUMENTS

2021/0278926 A1*   9/2021   Akhbari  ............... G06F 3/0436
2023/0333066 A1*  10/2023   Akhbari  ................ G01N 29/44

OTHER PUBLICATIONS

International Search Report and Written Opinion for International Patent Application No. PCT/US2022/044129, mailed Mar. 3, 2023, 19 pages.

* cited by examiner

APPLICATION 1    APPLICATION 2

SETTINGS    CAMERA    APPLICATION 3

APPLICATION N    APPLICATION 4

INPUT SURFACE OF INPUT STRUCTURE
RECEIVES A PHYSICAL INPUT    _600_

RECEIVE SENSOR SIGNALS FROM SENSOR(S)    _602_

FILTER EACH RECEIVED SENSOR SIGNAL    _604_

NORMALIZE EACH RECEIVED SENSOR SIGNAL    _606_

DETERMINE ONE OR MORE FEATURES    _608_

NO    DETECT INPUT
EVENT?
_610_

YES

NO    INPUT
EVENT AN
HMI INPUT?
_612_    YES

DO NOT EXECUTE ANY
ACTION    _614_

EXECUTE ACTION
ASSOCIATED WITH
HMI INPUT    _616_

SYSTEM AND METHOD FOR DISCERNING HUMAN INPUT ON A SENSING DEVICE

CROSS-REFERENCE TO RELATED APPLICATIONS

This application is a 35 USC 371 national phase filing of International Application No. PCT/US2022/044129, filed Sep. 20, 2022, which claims the benefit of U.S. Provisional Patent Application Ser. No. 63/246,029, filed on Sep. 20, 2021, the disclosures of which are incorporated herein by reference in their entireties.

TECHNICAL FIELD

The present disclosure relates generally to the detection and classification of physical inputs to human machine interface (HMI) applications and systems.

BACKGROUND

In general, an HMI includes hardware and/or software through which a user interacts with an electronic device. Many applications in the field of HMI applications and systems use a capacitive touch interface to register user intent (i.e., inputs). However, these types of capacitive touch interfaces may be susceptible to false readings when moisture or gloves are involved, for example. In some cases, capacitive touch interfaces may only detect the presence of a finger but may not discern whether the user intended to press the interface or if the interaction was caused by an adjustment or cleaning of the surface.

Capacitive interfaces can also limit a touch surface to non-conductive materials, such as glass or plastics with a certain thickness, which in turn limits the user interfaces that can be adopted. Because these types of touch interfaces rely on a change in capacitance to identify physical inputs, they will not work when the user is wearing gloves. The use of infrared (IR) and/or ultrasound can overcome certain limitations of capacitive touch interfaces (e.g., with the use of gloves), but often can only detect if a user is in the vicinity of the surface and not the intention behind an input (e.g., a touch on the screen).

In the field of non-capacitive touch sensing, mapping sensor readings to a location (e.g., on the interface) requires an extensive amount of domain knowledge and time. At times, this upfront work will still fall short of achieving the desired performance due to non-linearities of the system equations. Non-linearities can creep into a system through irregular or non-symmetrical boundary conditions, variation in material thickness, or any of a list of other mechanical variations, for example. Generally, engineers may follow an iterative design process that includes deriving system equations, developing an application, testing the application under stable conditions, and modifying equations to improve output. However, this cycle can take weeks or months, based on the complexity of the design, and performance is not guaranteed.

In some cases, non-capacitive technology includes sensing components and a control unit that have the capacity to detect touch events or anomalies, but many non-capacitive technologies fail or lack the ability to accurately determine touch location, press intensity, gesture type, and other types of physical interaction with an HMI surface. Further, there lacks a methodology that is universally applicable for creating an HMI system capable of recognizing user intent with accordance to the force applied. Many current systems and methods do not include a process that can register human interactions involving pressure and/or proximity for any given type of surface.

SUMMARY

One implementation of the present disclosure is a method for detecting and classifying different types of physical inputs on an input surface of an HMI input structure. Different locations and/or intensities of the physical inputs are determined using a surface integrated with interactive sensors, where the aforementioned method includes signal processing, feature extraction, classification, and function mapping.

In one aspect, a method for detecting and classifying physical inputs on an input surface of a human machine interface (HMI) input structure, where the input structure includes multiple sensors, includes receiving a sensor signal from at least one of the multiple sensors in response to a physical input on the input surface, and detecting an input event based on the physical input. One or more features associated with the sensor signal are determined. A location of the physical input on the input surface is determined by classifying the sensor signal using a machine learning algorithm based on the one or more features. An action associated with the determined location on the input surface is then executed.

In another aspect, a system includes a processing device and a memory operably connected to the processing device. The memory stores processor-executable instructions, that when executed by the processing device, cause operations to be performed. The operations include receiving a sensor signal from at least one of the multiple sensors in response to a physical input on the input surface, and detecting an input event based on the physical input. One or more features associated with the sensor signal are determined. A location of the physical input on the input surface is determined by classifying the sensor signal using a machine learning algorithm based on the one or more features. An action associated with the determined location on the input surface is then executed.

In some embodiments, each sensor may be any type of sensor that is capable of measuring changes to the physical surface or vicinity, for example but not limited to, a force sensor, an infrared sensor (e.g., an infrared receiver), a strain gauge, and an ultrasonic sensor.

In some embodiments, a signal processing stage may include the removal of Gaussian and/or non-Gaussian noise, using filtering methods such as median, windowing, and Savitzky-Golay.

In some embodiments, the signal processing stage may include drift removal that includes one or more drift estimation and removal techniques such as, but no limited to, Kalman filtering, deconvolution, high pass filtering using a Butterworth technique.

In some embodiments, the signal processing stage may include an event detection technique that determines when one or more sensor signals are diverging from a period of quiescence, indicated by readings surpassing some activation threshold difference from a reference level (e.g., a baseline signal level), in which the reference level is routinely updated using raw sensor signals or filtered sensor signals.

In some embodiments, an event detection technique detects and registers the application of pressure or force on one or more select areas of an input structure. These areas can be referred to as button actuation zones.

In some embodiments, one or more features for classification are computed using a magnitude and a polarity of the difference in sensor signals from the last period of quiescence to the currently detected event.

In some embodiments, the rate of change of one or more signals during a period of activity is used for classification, and where each rate of change may or may not be normalized by a summation of the individual rates (useful for button mode operation in systems with drift).

In some embodiments, one or more features may undergo a normalization with regard to the total response observed by one or more sensors, including all of the sensors or a subset of the sensors. A first subset of the one or more features may have a separate normalization factor from a second subset of the one or more features.

In some embodiments, classification is learned from a calibration or training process that includes data gathered from user interactions with an input surface of an input structure, with the data labeled as valid or invalid. In some embodiments, the data is embodied as presses on a defined button actuation zone on the input surface, and invalid data is embodied as presses outside the button actuation zones or other external interferences.

In some embodiments, one or more classification algorithms (e.g., machine learning algorithms) may be trained offline with the aid of machine learning models such as Decision Tree induction, as well as ensemble techniques that combine multiple decision trees into the over-arching classification algorithm, such as but not limited to Random forest and gradient boosting trees.

In some embodiments, one or more classification algorithms (e.g., machine learning algorithms) may be precomputed offline with the aid of machine learning models such as a Nearest Neighbor. a Support Vector Machine, a Neural Network, and/or a Recurrent Neural Network.

In some embodiments, one or more classification algorithms (e.g., machine learning algorithms) is improved by continually predicting locations of input events and averaging the predicted locations before making the final prediction of a location.

BRIEF DESCRIPTION OF THE FIGURES

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
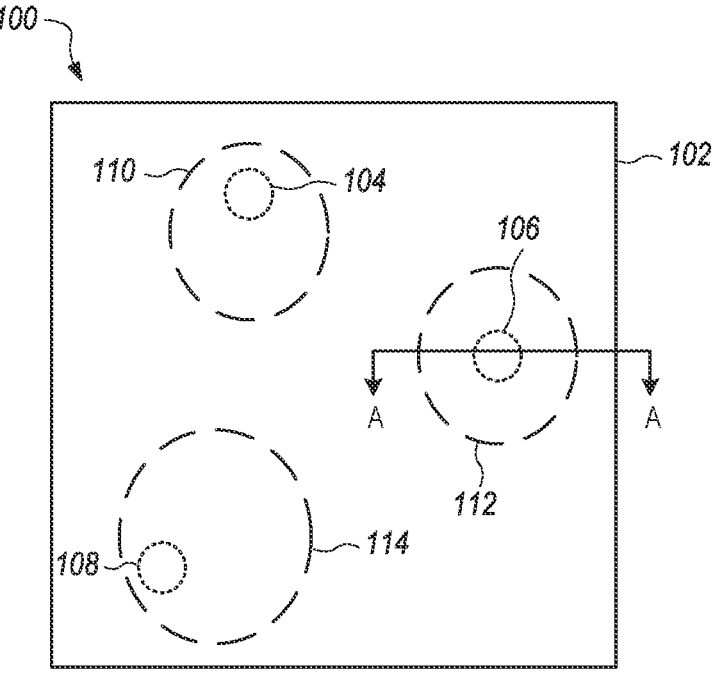
FIG. 1 illustrates top view of an input structure in accordance with embodiments of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises." "comprising." "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments disclosed herein provide techniques for the detection and classification of physical inputs (e.g., user inputs) to an HMI application and/or HMI system. Embodiments described herein can advantageously eliminate the cumbersome mathematical equations often found in other HMI systems with a set of procedures, state machines, and machine learning models. These systems and methods, as described in greater detail below, may be universally applicable to a variety of HMI systems, compromising of any boundary condition, and other mechanical variations. Additionally, the systems and methods described herein are not specific to any hardware configuration or any characterization profile. The use of statistical learning techniques allow for using in numerous designs that can have sophisticated sensor reading to intent mappings that are learned from little to no effort from the designer, and the data from multiple instances of a single design can be combined to develop an overarching model for all the surfaces.

In some embodiments, the system described herein maps sensor signals from a sensing system into an observed physical input (e.g., an observed user input). In some embodiments, the sensing system described herein includes a set of one or more sensors and a processing device attached to an HMI input surface (hereinafter "input surface"). The processing device may include a memory device (e.g., RAM, ROM, Flash memory, hard disk storage, etc.) and one or more processing devices (e.g., a general purpose processor, an application specific integrated circuit (ASIC), one or more field programmable gate arrays (FPGAs), a group of processing components, or other suitable electronic processing components) for implementing instructions stored on the memory device. Example memory and processing devices are described with regard to FIG. 10. The system may implement a method for mapping sensor readings or signals that includes digital signal processing, event and anomaly detection, discriminatory feature extraction, and a predictive model (e.g., classification and/or regression) for physical input prediction. In some embodiments, a physical input will have a preordained response that is carried out by the one or more processing devices of the system, such as a button press with one or more levels of intensity, a swipe, hover, trace, etc.

In some embodiments, the system implements a method that includes polling one or more sensors continuously or at a defined polling frequency (e.g., every second, every minute, every hour, etc.). Additionally or alternatively, the one or more sensors are polled in response to a physical input on an input structure. The processing device may establish a baseline signal level for all associated sensors acquired during a first one of a plurality of readings. In some embodiments, a filtering process may include a median filter in order to improve robustness to external noise factors. During a period of quiescence, baseline signal levels may be updated until they converge with new sensor signals. This can remove errors that may be introduced into the system by mechanical or thermal drift. An event detection program can notify the system when the sensor signal(s) are diverging from a period of quiescence. In some instances, the divergence is indicated by sensor signals surpassing some activation threshold difference from a reference (e.g., a baseline signal level).

The relationship between the response and an HMI input to the input surface may be learned through a calibration or training process and one or more machine learning algorithms. The training process may involve the collection of labeled user data. This data may be labeled as, but not limited to, pressing a location with one or more fingers, bending a surface, twisting a surface, performing a specific gesture, etc. These gestures are learned through a set of normalized features. Normalization decouples force delta from location delta to the first degree.

FIG. 1 illustrates top view of an input structure 100 in accordance with embodiments of the disclosure. The input structure 100 includes an input surface 102 and sensors 104, 106, 108 disposed below the input surface 102. The input surface 102 can be made of a rigid material or a non-rigid material. Example materials include, but are not limited to, metal, plastic, glass, and clastic. Each sensor 104, 106, 108 can include any type of sensor that is operable to detect a physical input (e.g., a user input) to the input surface 102 (referred to herein as an "input event"). Non-limiting nonexclusive examples of a sensor is a pressure or force sensor, an infrared sensor, a strain gauge sensor, and/or an ultrasonic sensor.

Button actuation zones 110, 112, 114 are logical areas on the input surface 102 that surround, or are proximate to, each sensor 104, 106, 108. In FIG. 1, the sensor 104 is associated with the button actuation zone 110. The sensor 106 is associated with the button actuation zone 112. The sensor 108 is associated with the button actuation zone 114. The button actuation zones 110, 112, 114 can have the same area or size, or at least one button actuation zone may have a size that differs from the size of other button actuation zones. In the illustrated embodiment, the button actuation zones 110, 112 have the same size while the button actuation zone 114 has a larger size compared to the size of the button actuation zones 110, 112.

Additionally, FIG. 1 depicts a shape of each button actuation zone 110, 112, 114 as a circular shape. In other embodiments, each button actuation zone 110, 112, 114 can have any shape. In non-limiting nonexclusive examples, the shape of a button actuation zone can have a circular shape, a rectangular shape, a semi-circle shape, or an oval shape. The button actuation zones 110, 112, 114 may have the same shape, or at least one button actuation zone may have a shape that differs from the shapes of the other button actuation zones.

Each sensor 104, 106, 108 can be located anywhere within or adjacent to a respective button actuation zone 110, 112, 114. For example, the sensor 104 is positioned offset from the center of the button actuation zone 110 (e.g., near an upper boundary of the button actuation zone 110). The sensor 106 is positioned in the center of the button actuation zone 112. The sensor 108 is positioned offset from the center of the button actuation zone 114 (e.g., at a lower left side of the button actuation zone 114).

In certain embodiments, an action is associated with one or more button actuation zones 110, 112, 114. Embodiments disclosed herein classify each input event to the input surface 102 as either being "on" one or more button actuation zones or "off" any button actuation zone. The action associated with respective one or more button actuation zones 110, 112, 114 is executed when an input event is classified as "on" one or more of the button actuation zone 110, 112, 114. No action is executed when an input event is classified as "off" any of the button actuation zone 110, 112, 114. Input events that are "on" one or more button actuation zones are referred to herein as HMI inputs.

FIG. 1 depicts the input structure 100 with three sensors 104, 106, 108 and three button actuation zones 110, 112, 114. However, other embodiments are not limited to this implementation. An input structure can have any number of sensors and button actuation zones.

Figure 2:
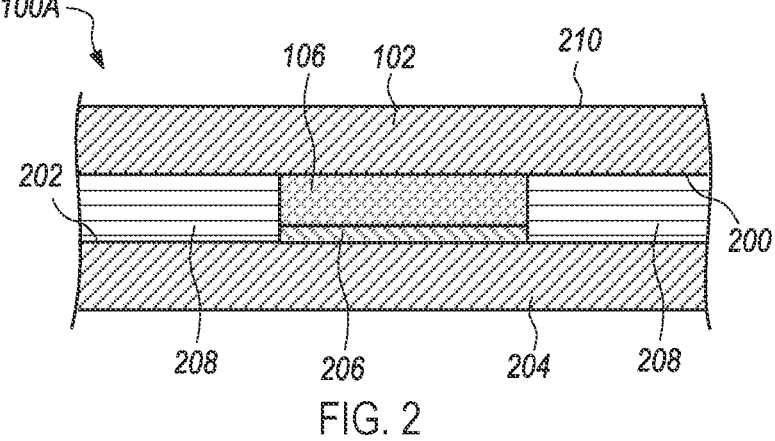
FIG. 2 illustrates a cross-sectional view of an example first implementation of the input structure shown in FIG. 1 taken along line A-A in accordance with embodiments of the disclosure.

FIG. 2 illustrates a cross-sectional view of an example first implementation of the input structure 100 shown in FIG. 1 taken along line A-A in accordance with embodiments of the disclosure. The example input structure 100A includes the sensor 106 positioned between a first surface 200 of the input surface 102 (e.g., a bottom surface of the input surface 102) and a first surface 202 of a second surface 204 (e.g., a top surface of the second surface 204). The second surface 204 may be made of the same material as the input surface 102, or the second surface 204 can be made of a material that differs from the material in the input surface 102.

The sensor 106 is operably connected (e.g., electrically connected) to a substrate 206, such as a printed circuit board (PCB) or a flexible printed circuit (FPC). The substrate 206 includes one or more signal lines (not shown) that are used to transmit signals to and/or transmit sensor signals from the sensor 106. An insulating material 208 is between the first surface 200 and the first surface 202 and around or adjacent to the sensor 106 and the substrate 206.

A physical input (e.g., a user input) is applied to a second surface 210 of the input surface 102 (e.g., a top surface of the input surface 102). In the illustrated embodiment, the second surface 210 is opposite the first surface 200. Depending on the type of physical input and/or the pressure applied to the input surface 102 (e.g., the second surface 210) during application of the physical input, the sensor 106 may output a sensor signal in response to the physical input. A processing device-based system (example shown in FIG. 10) is operable to receive sensor signals, detect input events, and classify input events as being "on" one or more respective button actuation zones (an HMI input) or "off" any button actuation zone.

Figure 3:
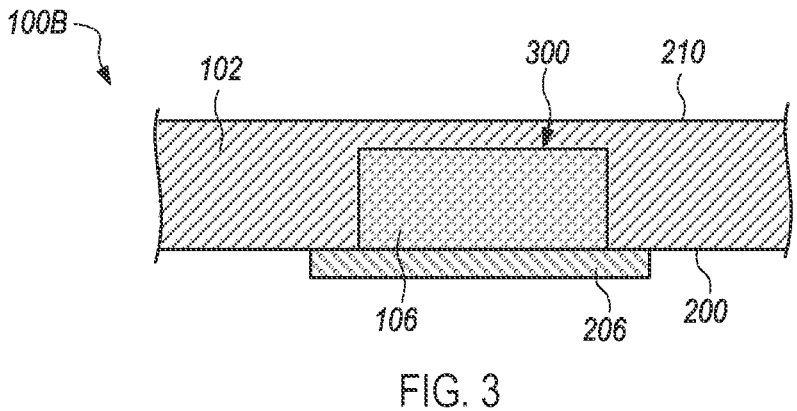
FIG. 3 illustrates a cross-sectional view of an example second implementation of the input structure shown in FIG. 1 taken along line A-A in accordance with embodiments of the disclosure.

FIG. 3 illustrates a cross-sectional view of an example second implementation of the input structure 100 shown in FIG. 1 taken along line A-A in accordance with embodiments of the disclosure. The example input structure 100B includes the sensor 106 positioned within a cavity 300 in the input surface 102. The substrate 206 is operably connected to the sensor 106. In illustrated embodiment, the cavity 300 has an opening at the first surface 200 of the input surface 102. The cavity 300 may be formed using any suitable process. For example, in one embodiment, the cavity 300 is etched into the input surface 102. In some embodiments, an insulating material (e.g., the insulating material 208 in FIG. 2) may be disposed in the cavity 300 between the sensor 106 and the input surface 102.

Similar to FIG. 2, a physical input (e.g., a user input) is applied to the second surface 210 of the input surface 102. Depending on the type of physical input and/or the pressure applied to the input surface 102 (e.g., the second surface 210) during application of the physical input, the sensor 106 may output a sensor signal in response to the physical input. The sensor signal(s) associated with the physical input may be used to classify the physical input as being "on" one or more respective button actuation zones (an HMI input) or "off" any button actuation zone.

Figure 4:
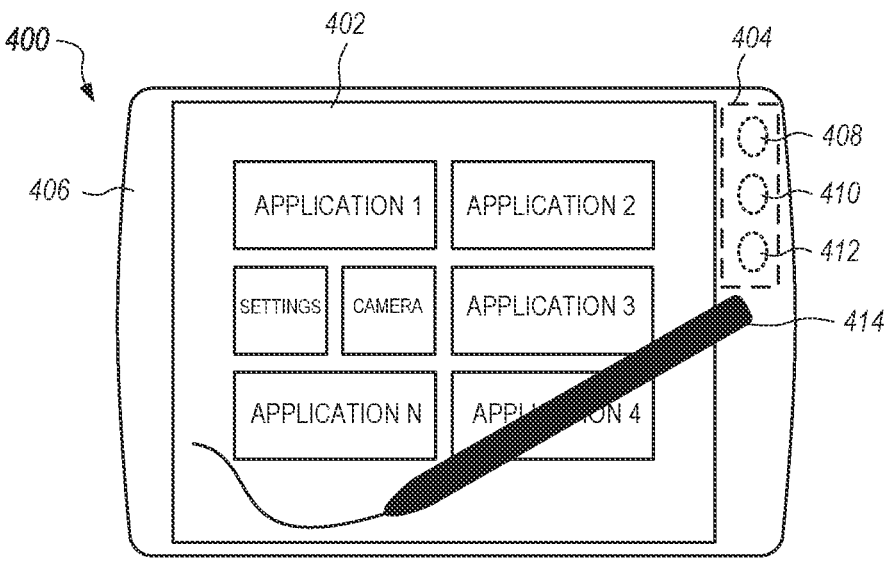
FIG. 4 illustrates an example electronic device that can include an input structure in accordance with embodiments of the disclosure.

An input structure can be included in any type of device or electronic device. Example devices and/or electronic devices that can include an input structure include, but are not limited to, computing devices (e.g., a laptop computer, a tablet), appliances (e.g., a refrigerator), automobiles (e.g., dashboards, steering wheels), remote controllers (e.g., a TV remote, a game controller), televisions, mobile devices (e.g., a mobile phone), and wearable devices (e.g., a smart watch, a fitness tracker, headphones or headsets). FIG. 4 illustrates an example electronic device 400 that can include an input structure in accordance with embodiments of the disclosure. The example electronic device 400 is a tablet computing device that includes a display 402 and an input structure 404 housed within an enclosure 406. In other embodiments, the electronic device 400 may include any number of input structures.

The input structure 404 includes sensors 408, 410, 412. The display 402 of the electronic device 400 may be operable to receive physical inputs via a stylus 414.

Sensor signals may be received from one or more of the sensors 408, 410, 412 in response to an input event on the input structure 404. The sensor signal(s) are processed to detect the input event and to classify a location of the input event (e.g., an HMI input or not). When a classification is that the input event is an HMI input, an action that is associated with the location is performed. In non-limiting nonexclusive examples, the action may be to modify a sound or volume level output by the electronic device 400 (e.g., increase the sound level), generate an alert, generate audio or haptic feedback, transmit a signal that represents the HMI input to an application or function on the electronic device 400 to cause the application or function to perform an action (e.g., application 1, application 2 . . . , application N, camera, or settings), change a setting of the display 402 (e.g., a brightness setting), and/or cause the electronic device to enter a sleep state or an off state.

Figure 5:
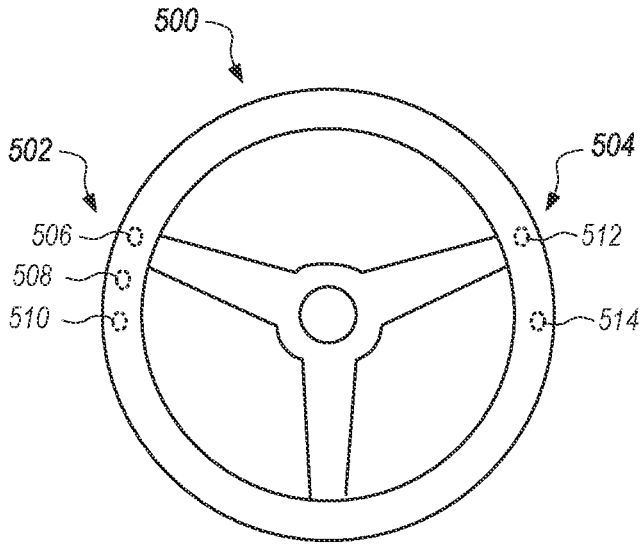
FIG. 5 illustrates an example device that can include multiple input structures in accordance with embodiments of the disclosure.

FIG. 5 illustrates an example device that can include multiple input structures in accordance with embodiments of the disclosure. The example device 500 is a steering wheel for an automobile. The device 500 includes (e.g., houses) a first input structure 502 and a second input structure 504. The first input structure 502 includes sensors 506, 508, 510, while the second input structure 504 includes sensors 512, 514. In other embodiments, the device 500 may include any number of input structures (e.g., one or more input structures).

Sensor signals may be received from one or more of the sensors 506, 508, 510 in response to an input event on the first input structure 502. Similarly, sensor signals may be received from one or more of the sensors 512, 514 in response to an input event on the second input structure 504. The sensor signal or signals are processed to detect input events and to classify a location of the input events (e.g., whether an HMI input or not). When a classification is that an input event is an HMI input, an action that is associated with the location of the input event is performed. In non-limiting nonexclusive examples, the action may be to modify a volume level output by a speaker system in the automobile (e.g., increase the volume level), generate an alert, generate a message, turn on or turn off a turn signal, provide tactile (e.g., haptic) or audio feedback, modify a setting of a cruise control application, turn on or turn off a radio, scan for a radio station, launch a global positioning system (GPS) and application, navigate a user interface that is displayed on a display in the automobile, and/or cause a network to connect to a mobile phone.

Figure 6:
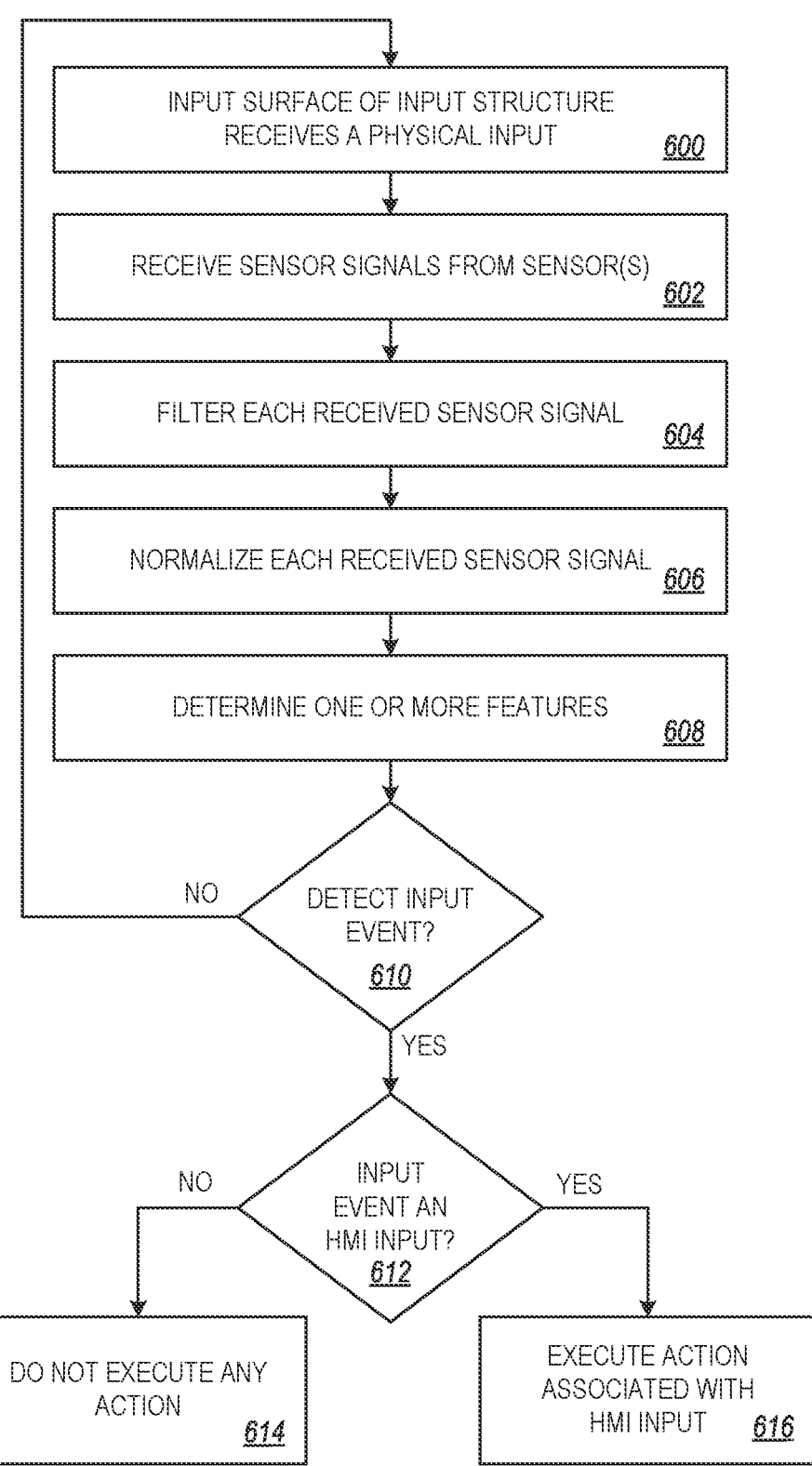
FIG. 6 illustrates a flowchart of a method of detecting and classifying input events in accordance with embodiments of the disclosure.

FIG. 6 illustrates a flowchart of a method of detecting and classifying input events in accordance with embodiments of the disclosure. Initially, as shown in block 600, a physical input is received on an input surface of an input structure. The physical input can be any type of an input, such as a force input, a tap, a swipe, a rotation, a double tap, a pinch, and the like. A sensor signal is received from at least one sensor of the input structure in response to the application of the physical input to the input structure (block 602). Additionally, the sensors may be polled either continuously or at select times (e.g., at a polling rate) to sample a sensor signal from at least one sensor. Alternatively, block 600 may be omitted and the sensors are polled either continuously or at select times (e.g., at a polling rate) to sample a sensor signal from at least one sensor.

Each received sensor signal can be filtered at block 604 to improve the quality of the sensor signal. For example, the sensor signal can be filtered to reduce or eliminate Gaussian or non-Gaussian noise using at least one of a median filtering technique, a windowing filtering technique, or a Savitzky-Golay filtering technique. Reducing or eliminating noise improves the signal-to-noise ratio of the sensor signal. Additionally or alternatively, the sensor signal may be filtered to estimate and reduce or eliminate drift of the sensor signal. In certain embodiments, drift may be reduced or eliminated with at least one of Kalman filtering, deconvolution, or high pass filtering using a Butterworth technique.

Some or all of the sensor signals are normalized at block 606. Described below is an example of a normalization process for an input structure that includes two sensors. For a location x on an input surface, sensor signals can be normalized as:

$$f_1 = c_1 \times F \qquad \text{Equation 1}$$

$$f_2 = c_2 \times F \qquad \text{Equation 2}$$

where $c_1$ is a multiplicative factor applied to a force F to get a reading for a first sensor $f_1$, and $c_2$ is a multiplicative factor applied to a force F to get a reading for a first sensor $f_2$. Advantageously, normalizing these variables can help to decrease input variance for the location x, or any other location on the input surface.

To generate possible value $f_1$ and/or $f_2$ can receive, the system may require collecting data for some or every possible level of force F. Using a normalization factor that represents a total system response can help remedy the requirement of the calibration or training procedure. Specifically, the normalization factor can be calculated as:

$$|c_1 \times F| + |c_2 \times F| \qquad \text{Equation 3}$$

which can be simplified to:

$$F \times (|c_1| + |c_2|) \qquad \text{Equation 4}$$

New features (e.g., $F_1$) can be defined as:

$$F_1 = \frac{(c_1 \times F)}{F \times (|c_1| + |c_2|)} = \frac{c_1}{|c_1| + |c_2|} \qquad \text{Equation 5}$$

And following the same logic for $F_2$:

$$F_2 = \frac{c_2}{|c_1| + |c_2|} \qquad \text{Equation 6}$$

Thus, characterizing the system's total variance can be reduced to calibrating for the error in treating the variables $c_1$ and $c_2$ as constant with respect to the force applied. In other embodiments, a normalization process can normalize the sensor signals from any number of sensors (e.g., two or more sensors).

In some instances, all of the sensors in an HMI system are used in one normalization process. For example, in FIG. 4, the sensors 408, 410, 412 may be a group of sensors and the sensor signals from the sensors 408, 410, 412 are used in one normalization process. In other instances, some but not all of the sensors are used in one normalization process. For example, in FIG. 5, the sensor signals from the sensors 506, 508, 510 but not the sensor signals from the sensors 512, 514 may be used in a first normalization process. The sensor signals from the sensors 512, 514 but not the sensor signals from the sensors 506, 508, 510 can be used in a second normalization process. One aspect that determines which sensor signals are included in a normalization process is based on the transfer of force from an input event on a given location on the input surface. For example, in FIG. 5, a force from an input event on the second input structure 504 can transfer to the sensors 512, 514. However, given the locations of the sensors 506, 508, 510 and the distance from the sensors 512, 514, the force from the same input event on the second input structure 504 does not transfer to the sensors 506, 508, 510. Thus, only the sensor signals from the sensors 512, 514 are used in a first normalization process. Similarly, the force from an input event on the first input structure 502 may transfer to the sensors 506, 508, 510 but not to the sensors 512, 514. Thus, only the sensor signals from the sensors 506, 508, 510 are used in a different second normalization process.

Next, as shown in block 608, one or more features associated with the sensor signals, the sensors, and/or respective button actuation zones are determined. Some or all of the one or more features will be used in a classification process to determine a location of a physical input. In some embodiments, at least one feature is computed using the magnitude and polarity of the difference in readings from a period of quiescence (e.g., the last period of quiescence) to the currently detected event. In some embodiments, the rate of change of one or more signals during a period of activity is used for classification, and where each rate of change may or may not be normalized by a summation of the individual rates (useful for button mode operation in systems with drift). For example, the one or more features may include a ratio of a respective sensor signal divided by a sum of all of the sensor signals that were included in the same normalization process. Example features are described in more detail in conjunction with FIG. 8.

A determination is made at block 610 as to whether an input event is detected. In certain embodiments, detection of the input event utilizes the differences between a signal reference level (e.g., a baseline signal level) to determine if there was an input event. An example technique for detecting input events is described in more detail in conjunction with FIG. 7.

If a determination is made at block 610 that an input event is not detected, the method returns to block 600. When a determination is made at block 610 that an input event is detected, the method continues at block 612 where a determination is made as to whether the detected input event is an HMI input. In certain embodiments, input event is classified based on a rate of change of the sensor signal during a period of activity (e.g., the time period between time T1 and time T2 in FIG. 7). Additionally or alternatively, one or more machine learning algorithms are used at block 612 to classify the detected input event to determine a location of the input event. When a machine learning algorithm(s) determines the input event is associated with a button actuation zone, the input event is an HMI input. When the machine learning algorithm(s) determines the input event is not associated with a button actuation zone, the input event is not an HMI input. In some embodiments, the machine learning algorithm(s) is improved by continually predicting the intent and averaging the predicted intents before making the final prediction. In some instances, the machine learning algorithm(s) may be precomputed offline with the aid of machine learning models such as a Decision Tree induction, a Random forest, a gradient boosting tree, a Nearest Neighbor, a Support Vector Machine, a Neural Network, and/or a Recurrent Neural Network. An example Decision Tree algorithm is described in more detail in conjunction with FIG. 8, and an example Nearest Neighbor algorithm is described in more detail in conjunction with FIG. 9.

If a determination is made at block 612 that the detected input event is not an HMI input, the method continues at block 614 where no action is taken in response to the detected input event. When a determination is made at block 612 that the detected input event is an HMI input, the method passes to block 616 where an action associated with the HMI input is executed (e.g., an action associated with one or more button actuation zones that received the HMI input is executed).

Figure 7:
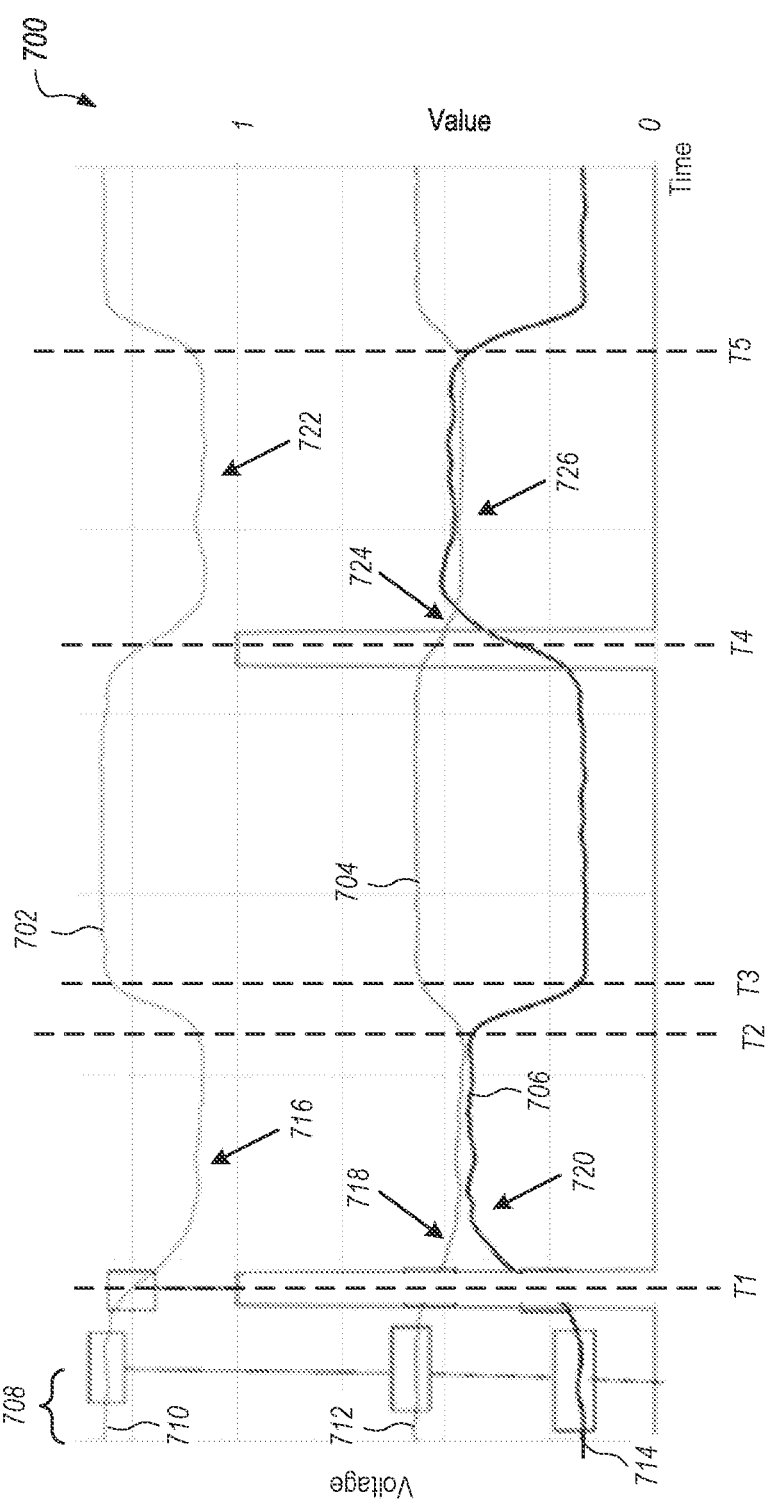
FIG. 7 illustrates an example graph of sensor signals that can be used to detect an input event to an input structure in accordance with embodiments of the disclosure.

FIG. 7 illustrates an example graph of sensor signals that can be used to detect an input event to an input structure in accordance with embodiments of the disclosure. The example graph 700 depicts a first sensor signal 702, a second sensor signal 704, and a third sensor signal 706. The left vertical axis represents a voltage level, the right vertical axis represents an input event detection (e.g., binary value 1 is an input event detection), and the horizontal axis represents time. Other embodiments can include a different number of sensor signals waveforms.

At a first time period 708, the first sensor signal 702 is at a first baseline signal level 710, the second sensor signal 704 is at a second baseline signal level 712, and the third sensor signal 706 is at a third baseline signal level 714. The first time period 708 is a first period of quiescence. The first baseline signal level 710 represents a first signal level (e.g., a voltage level of a first sensor) in the absence of a physical input (e.g., when no pressure is applied to an input structure). The second baseline signal level 712 represents a second signal level (e.g., the voltage level of a second sensor) in the absence of a physical input. The third baseline signal level 714 represents a third signal level (e.g., the voltage level of a third sensor) in the absence of a physical input. In other embodiments, the first baseline signal level 710, the second baseline signal level 712, and the third baseline signal level 714 may be set to any signal level.

In certain embodiments, one or more of the first sensor signal 702, the second sensor signal 704, and the third sensor signal 706 can be compared with the first baseline signal level 710, the second baseline signal level 712, and the third baseline signal level 714, respectively, to detect physical inputs. Additionally or alternatively, one or more of the first sensor signal 702, the second sensor signal 704, and the third sensor signal 706 can be compared with respective signal levels in another period of quiescence (e.g., between time T3 and time T4). The difference in a signal level from a respective signal level to a respective current signal level is used to detect an input event. For example, at time T1, an input event is detected in response to a physical input on an input structure. The input event can be detected based on the changes in the signal levels of the first sensor signal 702, the second sensor signal 704, and/or the third sensor signal 706. At time T1, the first sensor signal 702 transitions from the first baseline signal level 710 to a first signal level 716, the second sensor signal 704 transitions from the second baseline signal level 712 to a second signal level 718, and the third sensor signal 706 transitions from the third baseline signal level 714 to a third signal level 720. The input event may be detected by determining one or more of the sensor signals are diverging from a period of quiescence (e.g., the first time period 708). In some instances, the detection of the input event is based on an indication that at least one sensor signal has surpassed an activation threshold (e.g., a minimum difference between the current signal level and a respective baseline signal level).

At time T2, the application of the physical input to the input structure ends. For example, a user may remove the physical input from the input structure (e.g., lift the physical input from the input structure). Alternatively, the user may stop applying a pressure or force to the input structure. In response to the removal of the physical input, at time T3, the first sensor signal 702 transitions from the first signal level 716 back to the first baseline signal level 710, the second sensor signal 704 transitions from the second signal level 718 back to the second baseline signal level 712, and the third sensor signal 706 transitions from the third signal level 720 back to the third baseline signal level 714. In some instances, the signal levels of the first baseline signal 710, the second baseline signal 712, and/or the third baseline signal 714 at time T3 (or between time T3 and time T4) change from the signal levels at time T1. The time period between time T1 and time T2 is an active period, and the time period between time T3 and time T4 is a quiescence period.

At time T4, another input event is detected based on the application of a physical input on an input structure. At time T4, the first sensor signal 702 transitions from the first baseline signal level 710 to a fourth signal level 722, the second sensor signal 704 transitions from the second baseline signal level 712 to a fifth signal level 724, and the third sensor signal 706 transitions from the third baseline signal level 714 to a sixth signal level 726. Thereafter, at time T5, the application of the physical input ends and the first sensor signal 702 transitions from the fourth signal level 722 back to the first baseline signal level 710, the second sensor signal 704 transitions from the fifth signal level 724 back to the second baseline signal level 712, and the third sensor signal 706 transitions from the sixth signal level 726 back to the third baseline signal level 714. In some instances, the signal levels of the first baseline signal 710, the second baseline signal 712, and/or the third baseline signal 714 at time T5 (or after time T5) change from the signal levels at time T4. The time period between time T4 and time T5 is an active period, and the time period after time T5 is a quiescence period.

In other embodiments, for each input event, the sensor signals from a subset of the sensors are compared with signal levels during one or more quiescence periods to detect input events. For example, the sensor signal from one sensor may be compared to a respective signal level during one or more quiescence periods to detect input events. Alternatively, the sensor signals from two sensors may be compared to respective signal levels during one or more quiescence periods to detect input events. The one or more quiescence periods may be any quiescence period, such as an immediately prior quiescence period or the two prior quiescence periods.

In some embodiments, the graph 700 may be used in a training method for classifying input events. The right vertical axis (Value) indicates whether to include a sensor signal in the model building phase. In FIG. 7, a value of 1 indicates inclusion and value 0 indicates to exclusion from the model building phase. In some embodiments, multiple active periods may be included, each with a different delay from the start of the input event. These periods may have a separate classification model in order to increase classification accuracy as the signal profiles vary after the initial response. The method will record the baseline signal levels for each sensor during a quiescence period.

In a first example embodiment, the method shown in FIG. 7 is used to detect input events such as a single tap or a pressure or force input. In the first example embodiments, sensors such as force sensors or strain gauges may be used in an input structure. Additionally, the detection of the input events can be based on the analyses of the sensor signals with respect to respective baseline signal levels. In a second example embodiment, the method of FIG. 7 is used to detect input events that occur over a period of time. Examples of such input events include, but are not limited to, gestures such as a swipe, a pinch, a drag, rotation, and hover. In the second example embodiments, sensors such as infrared sensors or ultrasonic sensors may be used in an input structure. Additionally, the detection of the gesture input events can be based on the analyses of one or more sensor signals over time with respect to respective signal levels during one or more quiescence periods.

Figure 8:
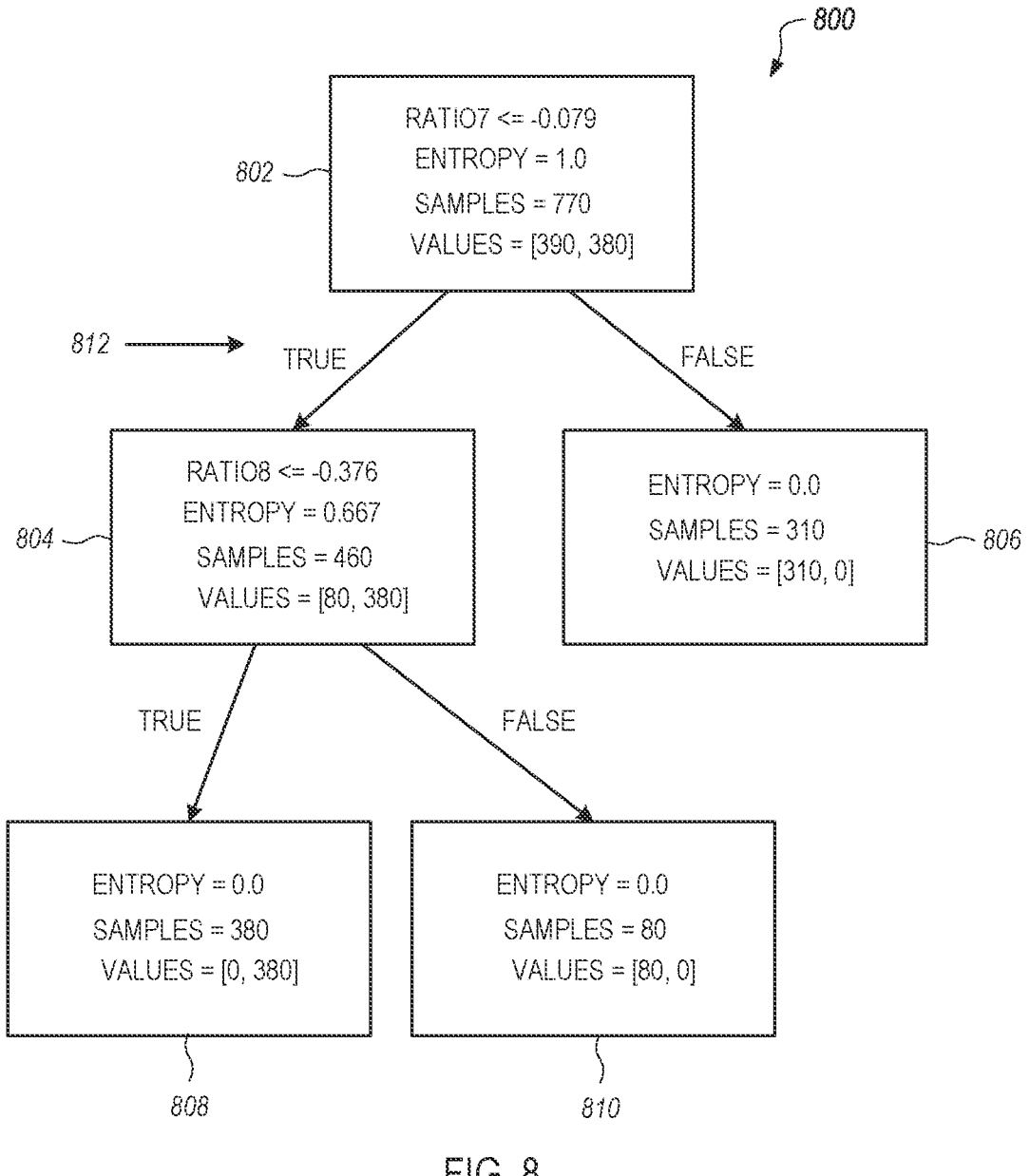
FIG. 8 illustrates a block diagram of an example first classification model that can be used to classify input events in accordance with embodiments of the disclosure.

FIG. 8 illustrates a block diagram of an example first classification model that can be used to classify input events in accordance with embodiments of the disclosure. The classification model is a decision tree algorithm 800. Decision tree algorithms build a series of decisions that are used to determine the classification of a datapoint. The term datapoint refers to the collection of sensor signals sampled, and the features that can be produced prior to and/or during a sensor event. Each datapoint is represented by a set of one or more features that are associated with one or more sensor signals, and/or a sensor. These one or more features can be determined at block 608 in FIG. 6.

Sensor signals that are received from the sensors in response to a physical input are compared to respective nodes in the decision tree algorithm 800 and the decision splits are followed based on the comparison(s). The decision splits in the decision tree 800 lead to a classification of an input event (e.g., to determine an HMI input). Successive splits are made that minimize the entropy of the sample counts at each node 802, 804, 806, 808, 810. One of these splits is shown by 812. In FIG. 8, the node 802 is associated with a ratio that is labeled "Ratio7". The feature "Ratio7" is a ratio of a sensor signal from a sensor 7 divided by a sum of all of the sensor signals (e.g., sensor signal from sensor 7 and sensor signal from sensor 8) that were included in the same normalization process for sensor 7. The value of Ratio7 is −0.079. The example node 802 further includes the features of an entropy value (1.0), a total number of samples that have been received from sensor 7, and a count of sensor signals that were classified as "on" one or more button actuation zones (e.g., 390 samples) and a count of sensor signals that were classified as "off" a button actuation zone (e.g., 380 samples).

In a non-limiting nonexclusive example, when a feature "Ratio7" that was determined for a received sensor signal is less than the Ratio7 value in the node 802 (−0.079), the process continues according to the "true" decision split to node 804. When the feature "ratio7" that is determined for the received sensor signal is greater than the Ratio7 value in the node 802 (−0.079), the process continues according to the "false" decision to end node 806. The classification algorithm continues until an end node is reached (e.g., end nodes 806, 808, 810). A respective end node represents a final classification for the detected input event.

The node 804 is associated with a ratio that is labeled "Ratio8". The feature "Ratio8" is a ratio of a sensor signal from a sensor 8 divided by a sum of all of the sensor signals (e.g., sensor signal from sensor 7 and sensor signal from sensor 8) that were included in the same normalization process for sensor 8. The value of Ratio8 is −0.376. The example node 804 further includes the features of an entropy value (0.667), a total number of samples that have been received from sensor 8, and a count of sensor signals that were classified as "on" one or more button actuation zones (e.g., 80 samples) and a count of sensor signals that were classified as "off" a button actuation zone (e.g., 380 samples).

The example node 806 is an end or sub node and includes the features of an entropy value (0.0), a total number of samples that have been classified at node 806 (310), and a count of sensor signals that were classified as "on" one or more button actuation zones (e.g., 310 samples) and a count of sensor signals that were classified as "off" a button actuation zone (e.g., 0 samples). The example node 808 is an end node that includes the features of an entropy value (0.0), a total number of samples that have been classified at node 808 (380), and a count of sensor signals that were classified as "on" one or more button actuation zones (e.g., 0 samples) and a count of sensor signals that were classified as "off" a button actuation zone (e.g., 380 samples). The example node 810 is an end node and includes the features of an entropy value (0.0), a total number of samples that have been classified at node 810 (80), and a count of sensor signals that were classified as "on" one or more button actuation zones (e.g., 80 samples) and a count of sensor signals that were classified as "off" a button actuation zone (e.g., 0 samples).

The end nodes 806, 808, 810 represent possible final classifications for detected input events. End node 806 represents an "on" button actuation zone classification based on all of the prior samples (310) being classified as "on" button actuation zone classifications. End node 808 represents an "off" button actuation zone classification based on all of the prior samples (380) being classified as "off" button actuation zone classifications. End node 810 represents an "on" button actuation zone classification based on all of the prior samples (80) being classified as "on" button actuation zone classifications.

The sum of the sample values in the end nodes 806, 808, 810 equals the sample values in a respective node. For example, the sum of the sample values in the end nodes 808, 810 equals the sample values in the node 804. Similarly, the sum of the sample values in the node 804 and in the end node 806 equals the sample values in the node 802. The sample values in the end nodes 806, 808, 810 are part of the same classification, or what's left after the decision tree algorithm 800 has made the maximum number of splits as defined by the hyperparameter of the machine learning algorithm. The goal of the machine learning algorithm is to create partitions in the feature space that create pure subgroups, i.e. presses that are classified as all "on" a button actuation zone or all "off" a button actuation zone. If a new sample gets partitioned into a pure subgroup, the conclusion can be that this sample also belongs to that same classification. In some instances, when a subgroup isn't pure due to the maximum splits being reached, the majority class is selected.

Figure 9:
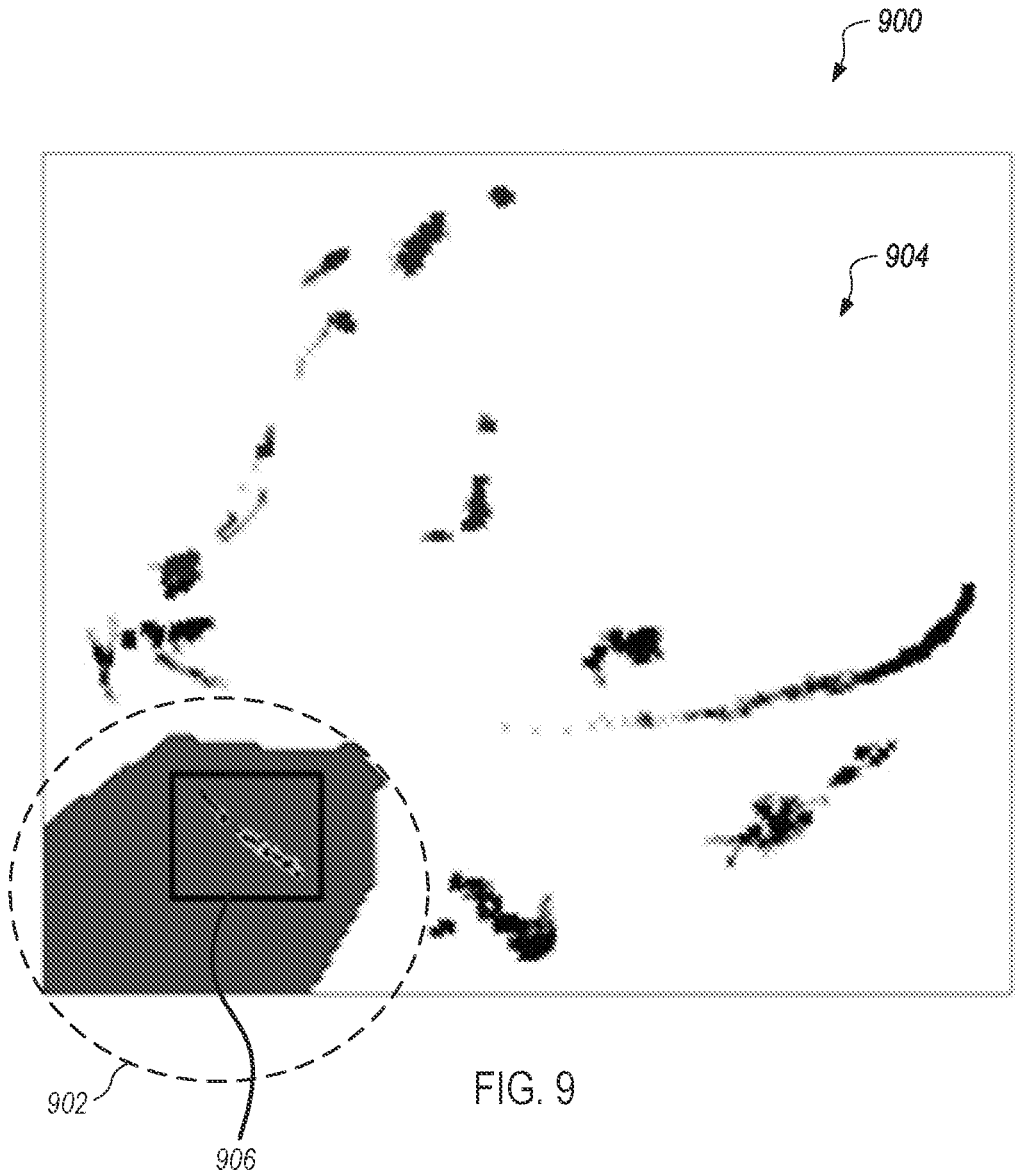
FIG. 9 illustrates an example second classification model that can be used to classify input events in accordance with embodiments of the disclosure.

FIG. 9 illustrates an example second classification model that can be used to classify input events in accordance with embodiments of the disclosure. The classification model is a nearest neighbor algorithm. FIG. 9 illustrates example feature space partitions 902, 904 that can be made by the nearest neighbor algorithm. As shown, the darker partition 902 is the feature space mapping to an "on" button actuation zone classification, and the lighter partition 904 is mapped to an "off" button actuation zone classification. Datapoints in the black box 906 are shown as solid dots that represent input events that are classified as "on" button actuation zones, while the x's in the partition 904 represent input events that are have been classified as "off" button actuation zones (or any other interaction that triggered the system's event detection (for example, twists, bends, etc.)). All of the datapoints are used to partition the feature space in the model fitting phase. Depending on the requirements of a system, the darker partition 902 and the lighter partition 904 can be fine-tuned by adjusting the nearest neighbor algorithm.

Figure 10:
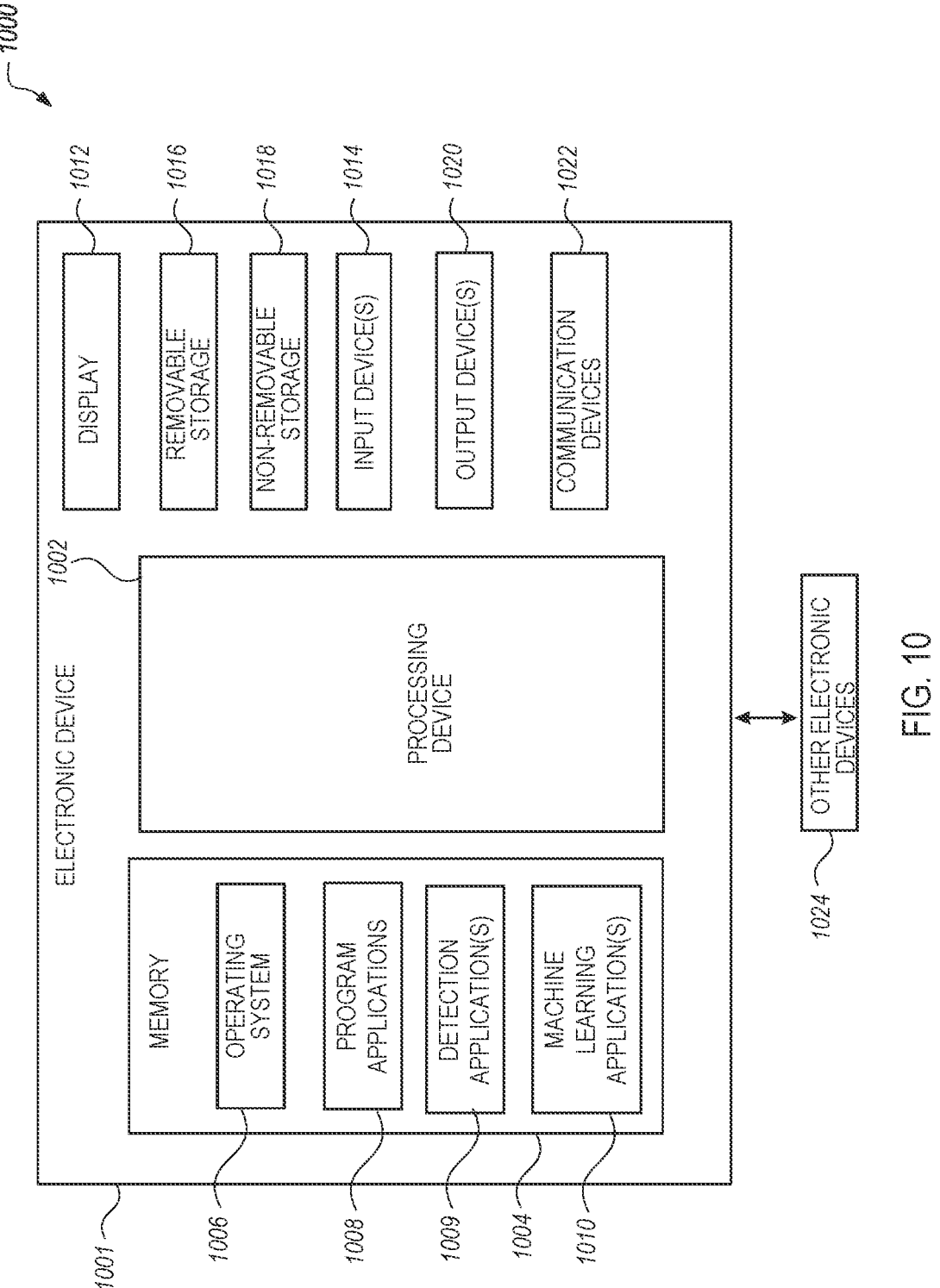
FIG. 10 is a block diagram of an electronic device that can be used to detect and classify input events in accordance with embodiments of the disclosure.

FIG. 10 is a block diagram of an electronic device 1000 that can be used to detect and classify input events in accordance with embodiments of the disclosure. It should be understood that the example electronic device 1000 is only one example of a suitable computing environment upon which the methods described herein may be implemented. Optionally, the electronic device 1000 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media. Some or all of the components in the electronic device 1000 may further be implemented in other types of devices, such as any device that is operable to include one or more input structures. Example devices include appliances (e.g., a refrigerator), automobiles (e.g., dashboards, steering wheels), remote controllers (e.g., a TV remote, a game controller), televisions, mobile devices (e.g., a mobile phone), and wearable devices (e.g., a smart watch, a fitness tracker, headphones or headsets).

The example electronic device 1000 includes an enclosure 1001 that houses a processing device 1002 and a memory 1004 (e.g., a storage device). Any suitable processing device 1002 can be used. For example, the processing device 1002 may be a microprocessor, an application specific integrated circuit, a field programmable gate array, or combinations thereof.

Depending on the configuration and type of the electronic device 1000, the memory 1004 may comprise, but is not limited to, volatile storage (e.g., random access memory), non-volatile storage (e.g., read-only memory), flash memory, or any combination of such memories. The memory 1004 can be configured to store processor-executable instructions that cause some or all of the aspects as described herein to be performed.

The memory 1004 may include a number of program applications and data files, such as an operating system 1006, one or more program applications 1008, one or more input event detection applications 1009, and one or more machine learning applications 1010. In some instances, at least one input event detection application and at least one machine learning application is implemented in a single application. While executing on the processing device 1002, at least one of the one or more input event detection applications 1009 and at least one of the one or more machine learning applications 1010 may perform and/or cause to be performed processes including, but not limited to, the aspects as described herein.

The operating system 1006, for example, may be suitable for controlling the operation of the electronic device 1000. Furthermore, embodiments of the disclosure may be practiced in conjunction with a graphics library, other operating systems, or any other application program and is not limited to any particular application or system.

The electronic device 1000 may have additional features or functionality. For example, the electronic device 1000 can include a display 1012 and one or more input devices 1014 that allow a user to enter information into the electronic device 1000. The display 1012 is operable to display a graphical user interface (GUI) of a client or of a developer portal. The input device(s) 1014 can include one or more input structures as well as buttons, a keyboard, a trackpad, a mouse, a pen, a sound or voice input device, or an audio input (e.g., a microphone jack). The display 1012 may also function as an input device (e.g., a touch-sensitive display that accepts touch and/or force inputs).

The electronic device 1000 may also include additional storage devices such as a removable storage device 1016 and a non-removable storage device 1018. The removable storage device 1016 and/or the non-removable storage device 1018 can be configured with the aspects as described herein. The removable storage device 1016 and the non-removable storage device 1018 are operable to store processor-executable instructions that when executed by the processing device 1002, may cause operations to be performed. The processor-executable instructions include some or all of the aspects as described herein. The memory 1004, the removable storage device 1016, and/or the non-removable storage device 1018 may include RAM, ROM, electrically erasable read-only memory (EEPROM), flash memory or other memory technology, CD-ROM, digital versatile disks (DVD) or other optical storage, magnetic storage devices, or any other article of manufacture which can be used to store information, and which can be accessed by the electronic device 1000. In one embodiment, the storage device does not include a carrier wave or other propagated or modulated data signal.

The electronic device 1000 may include one or more output devices 1020 such as a display (e.g., display 1012), an audio transducer (e.g., a speaker), a visual indicator (e.g., a light emitting diode), a vibration transducer for providing the user with tactile feedback (e.g., haptic feedback), an audio output (e.g., a headphone jack), or a video output (e.g., a HDMI port) for sending signals to or receiving signals from an external device. The aforementioned devices are examples and others may be used.

The electronic device 1000 may also include one or more wired or wireless communication devices 1022 allowing communications with other electronic devices 1024. Examples of suitable communication devices 1022 include, but are not limited to, radio frequency (RF) transmitter, receiver, and/or transceiver circuitry; universal serial bus (USB), parallel, and/or serial ports.

As should be appreciated, FIG. 10 is described for purposes of illustrating example methods and systems and is not intended to limit the disclosure to a particular sequence of steps or a particular combination of hardware or software components. In some instances, some or all of the components in the electronic device may be included in a device that is operable to detect and classify input events. For example, an automobile or a refrigerator may include a subset of the components shown in FIG. 10, such as the processing device 1002, the memory 1006, the one or more input event detection applications 1009, the one or more machine learning modules, and one or more input structures as the input device(s) 1014.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method for detecting and classifying physical inputs on an input surface of an input structure, wherein the input structure the input surface and a plurality of sensors, and wherein the method comprises:

polling at least one of the plurality of sensors at a defined polling frequency;

updating a baseline level for each of the at least one of the plurality of sensors until the baseline level converges during a quiescence period when the polling of the at least one of the plurality of sensors at the defined polling frequency is occurring;

receiving a sensor signal generated by at least one of the plurality of sensors in response to a physical input on the input surface;

detecting an input event based on the physical input wherein detecting the input event based on the physical input comprises determining that a voltage level of the sensor signal from the at least one of the plurality of sensors is diverging from the updated baseline level from the quiescence period;

determining one or more features associated with the sensor signal and the at least one of the plurality of sensors;

determining a location of the physical input on the input surface by classifying the sensor signal using a machine learning algorithm based on the one or more features; and executing an action associated with the determined location on the input surface.

2. The method of claim 1, wherein each sensor in the plurality of sensors is configured to measure changes to the input surface of the input structure or to detect movement on the input surface.

3. The method of claim 2, wherein each sensor in the plurality of sensors comprises at least one of a force sensor, an infrared sensor, a strain gauge, or an ultrasonic sensor.

4. The method of claim 1, further comprising filtering the sensor signal from the at least one of the plurality of sensors or to remove noise from the sensor signal.

5. The method of claim 1, further comprising filtering the sensor signal from the at least one of the plurality of sensors by estimating and removing drift.

6. The method of claim 5, wherein the drift is removed by at least one of Kalman filtering, deconvolution, or high pass filtering using a Butterworth technique.

7. The method of claim 1, wherein determining the sensor signal from the at least one of the plurality of sensors is diverging from the quiescence period comprises determining the sensor signal from the at least one of the plurality of sensors is diverging from the quiescence period based on an indication that the voltage level of the sensor signal associated with the one or more of the plurality of sensors has surpassed the baseline level by an activation threshold.

8. The method of claim 7, wherein the activation threshold is based on a baseline signal level that is updated at select times based on sensor signals received from the plurality of sensors.

9. The method of claim 1, wherein the one or more features are determined using a magnitude and a polarity of a difference between a signal level of the sensor signal and a baseline signal level for the sensor signal.

10. The method of claim 1, wherein the sensor signal is further classified based on a rate of change of the sensor signal during an active period.

11. The method of claim 1, wherein the machine learning algorithm is at least one of a Decision Tree induction, a Random forest, a gradient boosting tree, a Nearest Neighbor, or a Support Vector Machine.

12. A system, comprising:

a processing device;

an input structure comprising an input surface and a plurality of sensors below the input surface; and a memory operably connected to the processing device and storing processor-executable instructions, that when executed by the processing device, cause operations to be performed, the operations comprising:

polling at least one of the plurality of sensors at a defined polling frequency;

updating a baseline level for each of the at least one of the plurality of sensors until the baseline level converges during a quiescence period when the polling of the at least one of the plurality of sensors at the defined polling frequency is occurring;

receiving a sensor signal generated by the at least one of the plurality of sensors in response to a physical input on the input surface;

detecting an input event based on the physical input wherein detecting the input event based on the physical input comprises determining that a voltage level of the sensor signal from the at least one of the plurality of sensors is diverging from the updated baseline level from the quiescence period;

determining one or more features associated with the sensor signal and the at least one of the plurality of sensors;

determining a location of the physical input on the input surface by classifying the sensor signal using a machine learning algorithm based on the one or more features; and executing an action associated with the determined location on the input surface.

13. The system of claim 12, wherein determining the location of the physical input on the surface by classifying the sensor signal based on the one or more features comprises determining the location of the physical input on the input surface by classifying the sensor signal using a machine learning algorithm based on the one or more features.

14. The system of claim 12, wherein determining the sensor signal from the at least one of the plurality of sensors is diverging from the quiescence period comprises determining the sensor signal from the at least one of the plurality of sensors is diverging from the quiescence period based on an indication that that the voltage level of the sensor signal associated with the one or more of the plurality of sensors has surpassed the baseline level by an activation threshold.

15. The system of claim 14, wherein the activation threshold is based on a baseline signal level that is updated at select times based on sensor signals received from the plurality of sensors.

16. The system of claim 12, wherein each sensor in the plurality of sensors comprises at least one of a force sensor, an infrared sensor, a strain gauge, or an ultrasonic sensor.

17. The system of claim 12, wherein the memory stores further processor-executable instructions for filtering the sensor signal from the at least one of the plurality of sensors or to remove noise from the sensor signal.

18. The system of claim 12, wherein the memory stores further processor-executable instructions for filtering the sensor signal from the at least one of the plurality of sensors by estimating and removing drift.

19. The system of claim 18, wherein the drift is removed by at least one of Kalman filtering, deconvolution, or high pass filtering using a Butterworth technique.

* * * * *